(12) United States Patent
Zoldi et al.

(10) Patent No.: US 10,102,530 B2
(45) Date of Patent: *Oct. 16, 2018

(54) CARD FRAUD DETECTION UTILIZING REAL-TIME IDENTIFICATION OF MERCHANT TEST SITES

(71) Applicant: FAIR ISAAC CORPORATION, Roseville, MN (US)

(72) Inventors: Scott Michael Zoldi, San Diego, CA (US); Ilya Levner, Woodinville, WA (US); Maria Derderian, Escondido, CA (US)

(73) Assignee: Fair Isaac Corporation, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,859

(22) Filed: Apr. 11, 2018

(65) Prior Publication Data

US 2018/0232737 A1 Aug. 16, 2018

Related U.S. Application Data

(63) Continuation of application No. 13/664,411, filed on Oct. 30, 2012, now Pat. No. 9,953,321.

(51) Int. Cl.
*G06Q 20/40* (2012.01)

(52) U.S. Cl.
CPC ................ *G06Q 20/4016* (2013.01)

(58) Field of Classification Search
CPC ............. G06Q 20/4016; G06Q 20/401; G06Q 10/0635; G06Q 20/382; G06F 2221/033
See application file for complete search history.

(56) References Cited

U.S. PATENT DOCUMENTS

| | | | | |
|---|---|---|---|---|
| 6,330,546 B1* | 12/2001 | Gopinathan | ........... | G06Q 20/00 705/35 |
| 7,403,931 B2* | 7/2008 | Tayebnejad | ............ | G06Q 40/08 706/14 |

(Continued)

OTHER PUBLICATIONS

Pandey, Manoj, "A model for managing online fraud risk using transaction validation", The Journal of Operational Risk, vol. 5, No. 1, Spring 2010, pp. 1-17. (Year: 2010).*

*Primary Examiner* — Mohammad Z Shaikh
(74) *Attorney, Agent, or Firm* — Mintz, Levin, Cohn, Ferris, Glovsky and Popeo, P.C.

(57) ABSTRACT

A system and method for detecting a test event involving a financial transaction device at a merchant having a merchant profile is disclosed. The method includes receiving data associated with a transaction involving a financial transaction device; calculating a score using at least the transaction data; comparing the score to a threshold value; and attaching a merchant probe flag to the merchant profile if the score exceeds the threshold value. The merchant probe flag indicates a likelihood that a test event has occurred at the merchant based on the score. If a test event has occurred, then financial transaction devices involved in the test event can have their profiles updated to reflect that they have been probed. If a financial transaction device that has been probed is used in a subsequent transaction, then a specialized fraud scoring model can be used to provide an improved fraud risk score.

20 Claims, 7 Drawing Sheets

(56) References Cited

U.S. PATENT DOCUMENTS

| | | | | |
|---|---|---|---|---|
| 7,587,348 B2* | 9/2009 | Liao | G06Q 20/10 | 705/35 |
| 7,668,769 B2* | 2/2010 | Baker | G06Q 10/067 | 705/35 |
| 7,716,135 B2* | 5/2010 | Angell | G06Q 20/10 | 705/44 |
| 7,815,106 B1* | 10/2010 | McConnell | G06Q 30/02 | 235/376 |
| 7,849,029 B2* | 12/2010 | Crooks | G06Q 20/40 | 706/20 |
| 7,850,891 B2* | 12/2010 | Ilda | B29C 45/1615 | 264/255 |
| 7,870,608 B2* | 1/2011 | Shraim | H04L 51/12 | 726/22 |
| 8,001,597 B2* | 8/2011 | Crooks | G06Q 20/40 | 713/160 |
| 8,036,967 B2 | 10/2011 | Adams | | |
| 8,386,381 B1* | 2/2013 | Barton | G06Q 40/00 | 705/35 |
| 8,458,069 B2* | 6/2013 | Adjaoute | G06Q 40/02 | 705/318 |
| 8,473,415 B2* | 6/2013 | Siegel | G06Q 20/04 | 705/38 |
| 8,595,200 B2* | 11/2013 | Meidan | G06Q 30/06 | 707/694 |
| 8,600,872 B1* | 12/2013 | Yan | G06Q 40/02 | 705/35 |
| 8,666,829 B1* | 3/2014 | Bruckhaus | G06Q 30/0609 | 705/26.1 |
| 8,706,587 B1 | 4/2014 | Bautista, Jr. et al. | | |
| 8,725,636 B1* | 5/2014 | Klein | G06Q 20/4016 | 705/1.1 |
| 8,799,122 B1* | 8/2014 | Del Favero | G06Q 40/02 | 705/35 |
| 8,805,737 B1* | 8/2014 | Chen | G06Q 40/02 | 235/380 |
| 8,862,526 B2* | 10/2014 | Miltonberger | G06Q 10/067 | 706/15 |
| 9,088,602 B2* | 7/2015 | Barriga | H04L 63/1416 | |
| 9,135,467 B2* | 9/2015 | Mishra | H04L 63/102 | |
| 9,953,321 B2* | 4/2018 | Zoldi | G06Q 20/4016 | |
| 2002/0133721 A1* | 9/2002 | Adjaoute | G06Q 20/04 | 726/23 |
| 2002/0194119 A1 | 12/2002 | Wright et al. | | |
| 2005/0033653 A1* | 2/2005 | Eisenberg | G06Q 20/12 | 705/26.8 |
| 2005/0222929 A1 | 10/2005 | Steier et al. | | |
| 2008/0140576 A1* | 6/2008 | Lewis | G06Q 10/0635 | 705/67 |
| 2008/0172316 A1* | 7/2008 | Adams | G06Q 20/40 | 705/35 |
| 2008/0253645 A1 | 10/2008 | Nauck et al. | | |
| 2010/0005029 A1* | 1/2010 | Nelsen | G06Q 20/3821 | 705/76 |
| 2010/0094791 A1* | 4/2010 | Miltonberger | G06Q 10/067 | 706/46 |
| 2010/0169137 A1 | 7/2010 | Jastrebski et al. | | |
| 2011/0142217 A1 | 6/2011 | Goldfarb | | |
| 2011/0225076 A1* | 9/2011 | Wang | G06Q 20/12 | 705/35 |
| 2012/0047072 A1* | 2/2012 | Larkin | G06Q 20/02 | 705/44 |
| 2012/0159647 A1 | 6/2012 | Sanin et al. | | |
| 2013/0085769 A1 | 4/2013 | Jost et al. | | |
| 2014/0089193 A1* | 3/2014 | Boding | G06Q 20/382 | 705/44 |
| 2014/0108251 A1* | 4/2014 | Anderson | G06Q 20/4016 | 705/44 |
| 2014/0122325 A1* | 5/2014 | Zoldi | G06Q 20/4016 | 705/39 |

* cited by examiner

CARD FRAUD DETECTION UTILIZING REAL-TIME IDENTIFICATION OF MERCHANT TEST SITES

CROSS REFERENCE TO RELATED APPLICATIONS

This application is a continuation of U.S. application Ser. No. 13/664,411, filed on Oct. 30, 2012, and entitled "Card Fraud Detection Utilizing Real-Time Identification of Merchant Test Sites," the disclosure of which is incorporated herein by reference.

TECHNICAL FIELD

This disclosure relates generally to fraud detection and risk management and, more particularly, to the real-time detection of testing behaviors indicative of card not present (CNP) fraud at a merchant site.

BACKGROUND

The nature of credit card fraud has shifted in recent years. In the past, credit card skimming or cloning was a popular option among fraudsters. In credit card skimming schemes, thieves can use a device to steal credit card information from a credit card in an otherwise legitimate transaction and use the stolen information to clone a new credit card. This practice, however, has declined with the growing use of Europay MasterCard Visa (EMV) integrated circuit cards (chip cards). These chip cards have made it difficult for fraudsters to use cloned cards at physical merchants. Because cloning schemes have become less effective, fraudsters have turned their attention to CNP fraud in order to bypass the chip-related features of EMV cards.

CNP fraud involves the unauthorized use of a credit or debit card number to purchase products or services in a non-face-to-face setting. CNP fraud generally takes place on the Internet although some fraudsters perpetrate it through call center operations or through the mail. In these transactions, the merchant does not physically inspect the credit card. The incidence rate of CNP fraud is rising and accounts for more than 50% of card fraud losses worldwide. In view of this alarming trend, there is a need to develop preventive mechanisms to combat CNP fraud.

Many CNP schemes follow a similar pattern. This pattern generally begins with the theft or mass compromise of numerous cards. These stolen or compromised cards are then sold in batches via the Internet to prospective buyers. Because some of these cards may be inactive or blocked, buyers must test these cards before attempting a fraudulent event.

Testing can occur anonymously at CNP Internet testing sites. At these testing sites, a fraudster can determine which cards are active by cycling through a batch of cards and charging a nominal amount to each probed card. Probed cards that can accept the charge are considered active and can be used at a later date in a fraudulent event.

Because batch testing of these cards is a precursor to a fraudulent event, the real-time detection of a test event and the flagging of probed cards as high risk accounts can help prevent CNP fraud. Although test event detection can also be based on a common point of purchase (CPP), such as a particular Internet test site, a fraudster may intentionally mix CPPs in order to distribute fraudulent charges over a large footprint to avoid detection. As such, the real-time detection of test events is preferred.

SUMMARY

This document discloses a system and method for detecting the real-time testing of compromised cards using real-time merchant profiles (RTMP) and the implementation of specialized scoring models for these cards to enhance fraud detection.

Fraudsters engaging in CNP fraud generally test cards en masse using online merchant websites. Using these merchant websites, fraudsters can charge a nominal transaction amount with a low dollar value to each card to test whether the card is inactive or has been blocked. Using nominal charges decreases the likelihood that any given test transaction will be flagged by a customer's bank. When a batch of cards is tested, the selected merchant site can experience a large number of low dollar transactions in rapid succession indicative of a test or probe event. The terms test event and probe event are used interchangeably throughout this document.

An RTMP can detect, in real-time, these test events. This detection can be made by monitoring changes in the frequency of suspected test events across a group of cards and comparing these changes to historical transaction patterns. Deviations from historical patterns can be indicative of a test event. Upon detection of a test event, information from an RTMP can be used to mark the cards involved in the test event as probed. Cards that have been probed can be monitored for potential fraudulent use. This monitoring can occur for a specific period of time, for a fixed number of transactions based on the card's involvement in the test event, or based on the activity of other cards linked to the test event, or a combination of these characteristics.

If a probed card is subsequently used in a transaction that appears fraudulent, then a model tailored for probed, high-risk customers can be invoked. This model can adjust the existing fraud score associated with the card or block and remove the card from use before a fraudulent transaction occurs.

In accordance with an implementation, a computer-implemented method for detecting a test event involving a financial transaction device at a merchant is disclosed. In some implementations, the merchant has a merchant profile, and the merchant profile is associated with a set of variables. In some implementations, the method comprises receiving data associated with a transaction involving the financial transaction device; calculating a score using the received data and the set of variables; comparing the score to a threshold value; and attaching a merchant probe flag to the merchant profile if the score exceeds the threshold value, the merchant probe flag indicating a likelihood that a test event has occurred at the merchant based on the score.

In other implementations, the method further comprises setting a probe flag associated with the financial transaction device to indicate that the financial transaction device is in a probed state or an unprobed state, the setting occurring after the merchant probe flag indicator is attached to the merchant profile. In yet other implementations, the method further comprises executing a first scoring methodology when the probe flag indicates that the financial transaction device is in the probed state and a second scoring methodology when the probe flag indicates that the financial transaction device is in the unprobed state. In still other implementations, the method further comprises updating a probe risk associated with the financial transaction device, the probe risk dictating the period of time that the financial transaction device is considered at risk.

In some implementations, the updating involves decrementing the probe risk after a predefined period of time or after a predefined number of transactions involving the financial transaction device. In yet other implementations, the financial transaction device is associated with an event key representing the test event, and the updating involves increasing the probe risk when at least a second financial transaction device having the same event key has been used fraudulently or has been involved in a transaction associated with a high fraud score. In still other implementations, the calculating uses a recursive transaction function to characterize behavior indicative of the test event. In some implementations, the test event is a pattern of successive low dollar purchases. In other implementations, the financial transaction device is a credit card, a debit card, or a smart phone configured to execute a financial transaction application.

In accordance with another implementation, a computer program product comprising a non-transitory storage medium readable by at least one processor is disclosed. In some implementations, the non-transitory storage medium stores instructions for execution by the at least one processor for detecting a test event involving a financial transaction device at a merchant. In some implementations, the merchant has a merchant profile, and the merchant profile is associated with a set of variables. In yet other implementations, these instructions comprise: receiving data associated with a transaction involving the financial transaction device; calculating a score using the received data and the set of variables; comparing the score to a threshold value; and attaching a merchant probe flag to the merchant profile if the score exceeds the threshold value, the merchant probe flag indicating a likelihood that a test event has occurred at the merchant based on the score.

In other implementations, the instructions further comprise setting a probe flag associated with the financial transaction device to indicate that the financial transaction device is in a probed state or an unprobed state, the setting occurring after the merchant probe flag indicator is attached to the merchant profile. In yet other implementations, the instructions further comprise executing a first scoring methodology when the probe flag indicates that the financial transaction device is in the probed state and a second scoring methodology when the probe flag indicates that the financial transaction device is in the unprobed state. In still other implementations, the instructions further comprise updating a probe risk associated with the financial transaction device, the probe risk dictating the period of time that the financial transaction device is considered at risk.

In some implementations, the updating involves decrementing the probe risk after a predefined period of time or after a predefined number of transactions involving the financial transaction device. In yet other implementations, the financial transaction device is associated with an event key representing the test event, and the updating involves increasing the probe risk when at least a second financial transaction device having the same event key has been used fraudulently or has been involved in a transaction associated with a high fraud score. In still other implementations, the calculating uses a recursive transaction function to characterize behavior indicative of the test event. In other implementations, the test event is a pattern of successive low dollar purchases.

In accordance with another implementation, a system for detecting a test event involving a financial transaction device at a merchant is disclosed. In some implementations, the merchant has a merchant profile, and the merchant profile is associated with a set of variables. In some implementations, the system comprises a first computer program module that receives data associated with a transaction involving the financial transaction device; a second computer program module that calculates a score using the received data and the set of variables; a third computer program module that compares the score to a threshold value; and a fourth computer program module that attaches a merchant probe flag to the merchant profile if the score exceeds the threshold value, the merchant probe flag indicating a likelihood that a test event has occurred at the merchant based on the score.

BRIEF DESCRIPTION OF THE DRAWINGS

Like reference symbols and labels in the various drawings indicate like elements.

DETAILED DESCRIPTION

This document discloses a system and method for detecting the real-time testing of compromised financial transaction devices, such as credit cards, debit cards, or even electronic devices such as a smart phone executing a financial transaction application. The system and method use an RTMP and the implementation of specialized models for these devices to enhance fraud detection. While the systems and methods described herein can be applied to any number and type of financial transaction devices, the systems and methods will be described mainly in a context relating to credit cards and their use.

Cardholder Profiles

Transaction profile analytics can be used to detect a variety of fraud including counterfeit lost and/or stolen CNP credit cards. One such analytics platform is the Falcon Fraud Manager developed by FICO. Falcon can generate a fraud score between 1 and 999, where higher scores represent transactions having a greater likelihood of fraud. These fraud scores can be computed using a fraud detection system 100 shown in FIG. 1.

Figure 1:
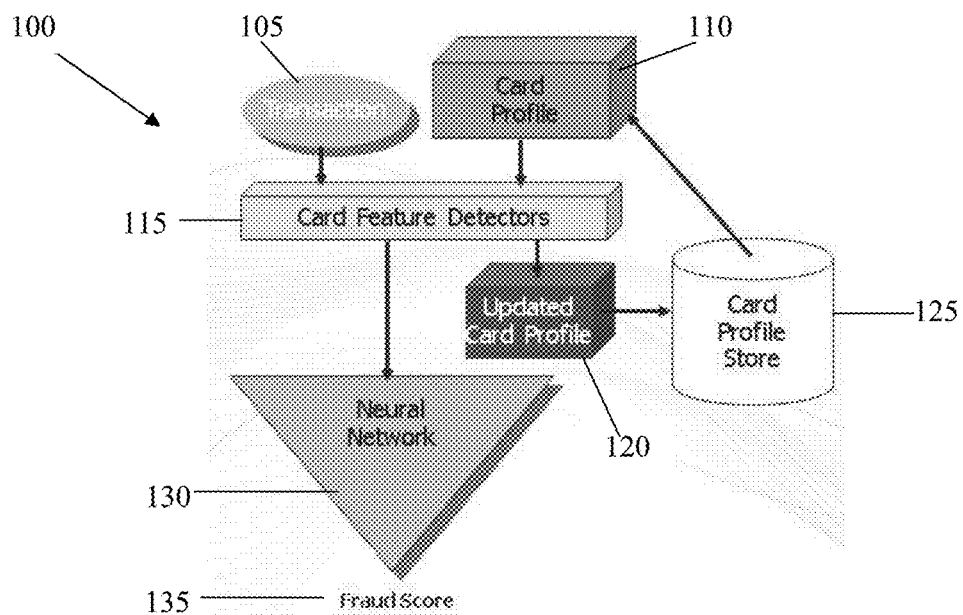
FIG. 1 shows an example credit card fraud detection system.

The fraud detection system 100 of FIG. 1 can use information associated with a transaction and a cardholder profile to compute a fraud score for the transaction. A person of ordinary skill would understand that other profile types can also be used for this computation. The cardholder profile can be a set of real-time recursive features that summarize a card's transaction history. Consequently, the cardholder profile can be continuously updated to include a series of current and past transactions. In order to assist with the detection of fraudulent activity, the cardholder profile can include various statistics including, for example, transaction patterns of normal behavior, recent transaction anomalies, deviations from historical baseline transaction patterns for the cardholder as well as the entire customer base, and significant events.

When transaction 105 occurs in the example system of FIG. 1, the system can search and extract card profile 110 of the credit card used in the transaction 105 from card profile store 125. Card profile 110 can be utilized alongside information associated with transaction 105 to generate a set of feature detectors indicative of fraud. For example, a feature detector can indicate whether a current transaction amount is significantly above or below the average transaction amount for a specific cardholder. Another feature detector can indicate whether a given transaction is likely to occur on a given day of the week or time of the day. Card feature detectors component 115 can be used to update card profile 120. Neural network 130 can use these features to compute a fraud score 135 for the transaction. Once the card profile is updated, it can be sent back to card profile store 125 and saved for future use.

Real-Time Merchant Profiles

Figure 2:
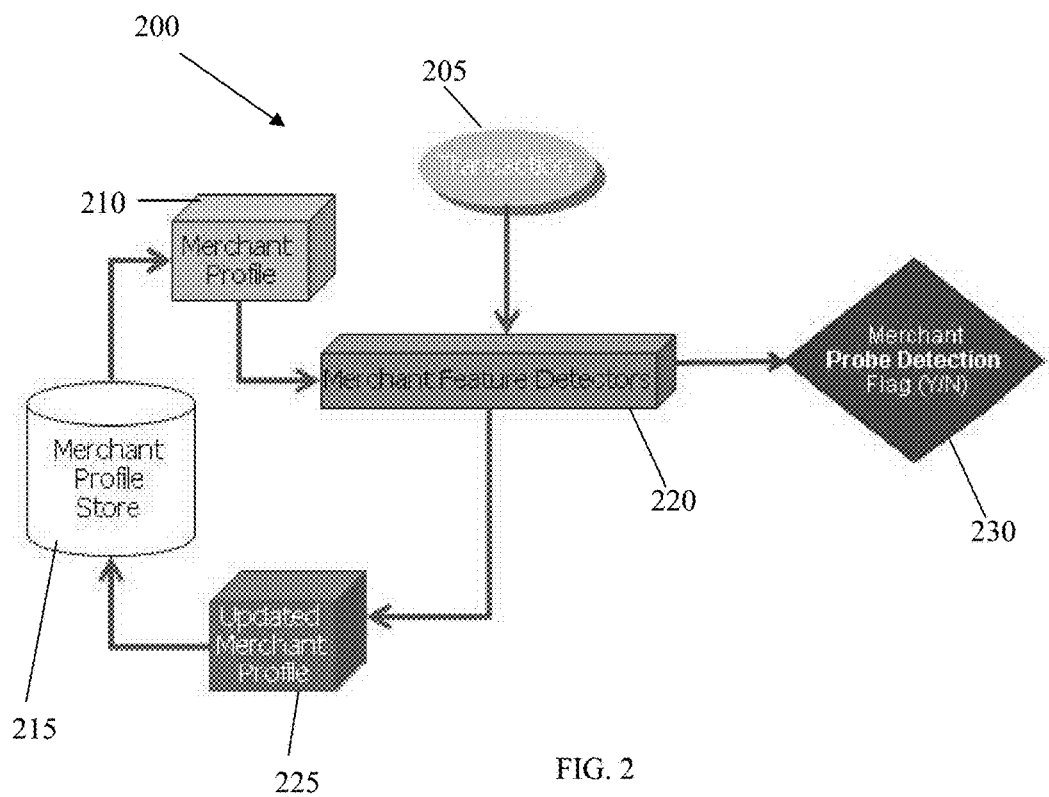
FIG. 2 shows an example credit card fraud detection system that can identify test or probe events at a merchant site in real-time using an RTMP.

The fraud detection system of FIG. 1 can be enhanced by including merchant site activity. FIG. 2 illustrates a system 200 for identifying test or probe events at a merchant site using an RTMP. When a merchant feature detectors component 220 receives transaction data from a transaction 205, the system 200 can identify and pull the profile 210 associated with the merchant from a merchant profile store 215. Data associated with the transaction 205 can be used alongside the merchant profile 210 to generate a score that can be indicative of a test or probe event. Typical testing behavior can include a large number of low dollar transactions in rapid succession. This information can be used to provide an updated merchant profile 225 which can be saved to the merchant profile store 215. If the generated score exceeds a predefined threshold value, then a merchant probe detection flag 230 can be attached to the merchant to indicate that the merchant has been probed.

Figure 3:
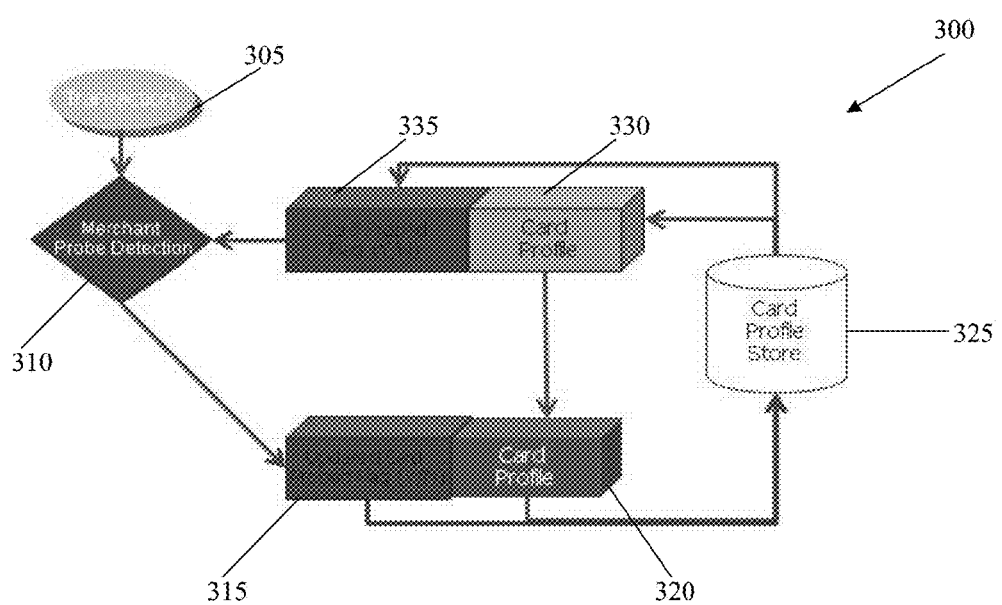
FIG. 3 shows an example credit card fraud detection system that can tag credit card accounts involved in a probe event.

Once a merchant has been probed, the profile of each card used during the test event can be tagged. FIG. 3 illustrates a system 300 that provides this tagging mechanism. This process can begin when a card is used in a transaction 305 at a merchant. When this transaction occurs, card profile 330 can be loaded from card profile store 325. Card profile 330 can have a card probed flag 335. If the merchant probe detection flag 310 associated with the merchant indicates that the merchant has been probed, then the card may be undergoing testing. The card's probed flag indicator 315, which can be a part of card profile 320, can be updated to reflect this testing status. For example, the updated card probed flag 315 can be set to "yes" to indicate that the card is undergoing testing or "no" to indicate that the card is not undergoing testing. This update can signify that the card has been used during a test event, and this information can be saved to the card profile store 325.

Figure 4:
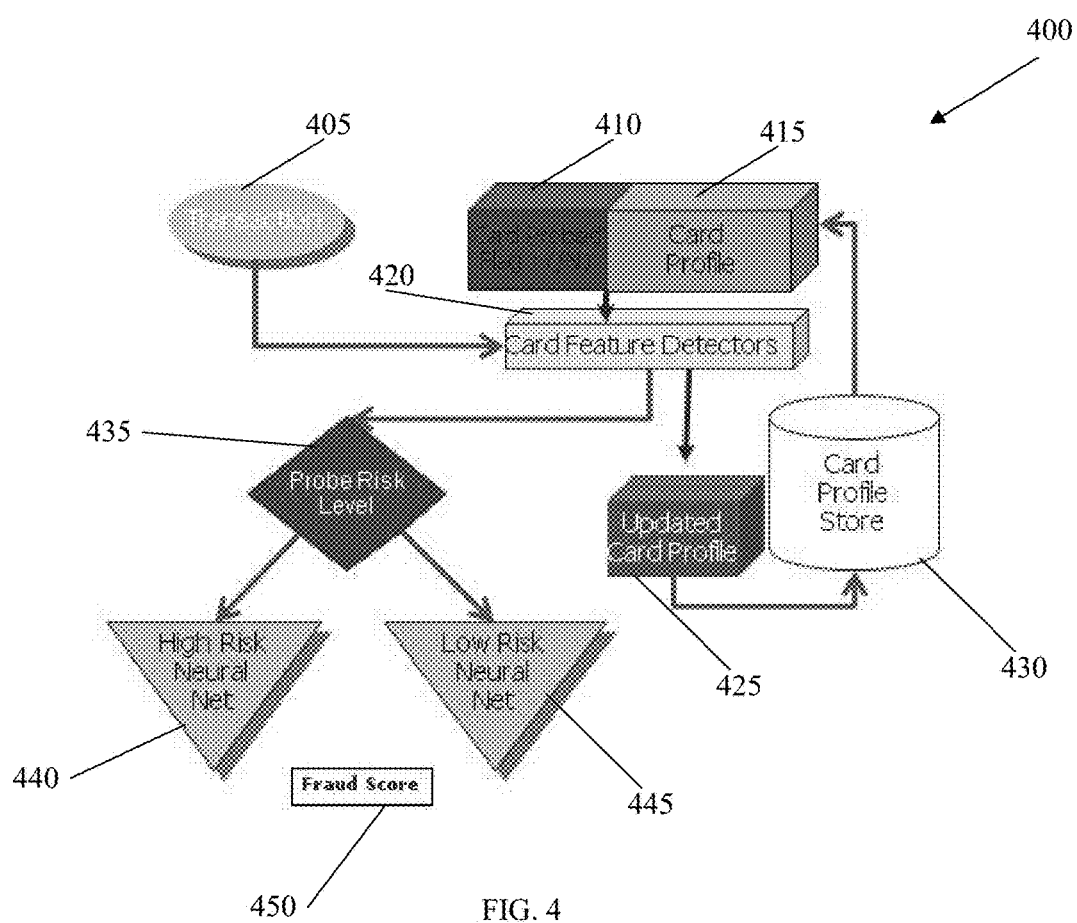
FIG. 4 shows an example credit card fraud detection system that can select a fraud scoring methodology based on a card's probe status.

Because there can be a high likelihood that a tested or probed card may be used for fraudulent purposes in subsequent transactions, these cards can be subjected to a specialized fraud scoring model different from the model applied to cards that have not been tested or probed. The example system 400 of FIG. 4 can provide this mechanism. It is noted that system 400 of FIG. 4 is similar to system 100 of FIG. 1. Here, however, when card profile store 430 pulls card profile 415 when transaction 405 occurs, the associated card probe flag 410 is also pulled. Card feature detectors 420 can be calculated by utilizing card profile 415 which includes card probed flag 410. For every valid transaction 405, changes are made to the features in the card profile which can be saved to updated card profile 425 and subsequently sent to card profile store 430 for future use. Once these features are computed, system 400 can assess the probe risk level 435 associated with the card by examining whether card probed flag 410 has been set. If a card has been previously tested or probed as evidenced by the card probed flag indicator (e.g., card probed flag 410 has been set to "yes"), then a specialized high risk neural network model 440 can be used to compute fraud score 450. The high risk neural network model 440 can be a custom fraud scoring model for at-risk probed cards. If, on the other hand, the card has not been tested or a probed (e.g., card probed flag 410 has been set to "no"), then a low risk neural network model 445 can be used to compute fraud score 450.

RTMP Test Site Detection

Real-time merchant profile analytics assist with the detection of a test or probe event as described above with respect to FIGS. 2-4. Typical testing behavior can be characterized by a rapid succession of low dollar purchases using numerous cards. RTMP analytics employ a recursive transaction function to detect this pattern of behavior and flag customers whose payment cards have been involved in a probe event. Although the following description focuses on a particular type of test behavior (i.e., successive low dollar purchases), RTMP analytics can be configured to detect other types of behavior indicative of a test or probe event. For example, a test event can be denoted by a transaction involving a particular dollar amount and having a particular fraud score (e.g., any transaction less than $50 and having a fraud score greater than 950). A person of ordinary skill would recognize that other combinations of parameters can be used to represent a test event.

In order to detect the presence of a test or probe event at a merchant site, an exemplary RTMP analytics program can be configured to monitor low dollar test transaction velocities. These transaction velocities can be compared to like transaction velocities of peer merchants in the same merchant category code (MCC). This comparison can be made during the same time period to ensure that any variance in transaction velocities is significant enough to generate a suspicious test site event.

In order to keep track of the various merchants in a system, each merchant can be identified by a unique merchant key, mkey. This key can be provided in every card authorization transaction. In some instances, session information or postings may be more appropriate given that some testing transactions may be under the floor limit. For example, when transactions are low dollar amounts, banks may decide not to send the transaction into the authorization stream. In these situations, the analytics would not see these types of low dollar test transactions. In addition to the above, a unique RTMP can be generated for each merchant which can be indexed by the merchant key. The RTMP can contain the variables needed to determine the likelihood that a test event has occurred at the merchant. These variables can include:

IS_SUSPECT_TEST: Represents a flag variable that can indicate that a transaction is a suspected testing event and a potential probing transaction (e.g., a low dollar purchase).

PCT_SUSPECT_TEST_nE: Represents a recursive variable that can compute the average number of IS_SUSPECT_

TEST transactions and having a decay parameter of n events. The decay parameter can be used to render the variable more or less sensitive to recent transactions compared to previous transaction.

$\mu_k$: Represents a long term recursive moving average of PCT_SUSPECT_TEST_nE, with a decay period of k where k>n events.

$\sigma_k$: Represents a long term recursive moving standard deviation of PCT_SUSPECT_TEST_nE, with a decay period of k where k>n events.

Although the IS_SUSPECT_TEST flag is described above with respect to low dollar test transactions, this variable is not so limited. Rather, it is understood that the IS_SUSPECT_TEST flag can identify other types of risky behavior including, for example, transactions with high fraud scores, transactions that occur outside of a cardholder's zip code, and transactions made by cardholders who have never made purchases at the MCC.

The variables $\mu_k$ and $\sigma_k$ can be recursive. The recursive nature of these variables can enable the real-time monitoring of suspected test or probe events at a merchant. Statistics for these variables can be computed recursively as transactions stream in. The formulas below can be used to estimate the mean and standard deviation from a stream of data. These formulas can be optimized by setting n=min (i,k), where k can represent the decay constant for the historical recursive moving mean/variance.

$X_i$—Value of variable x for $i^{th}$ record
$\mu_i$—Mean of values $x_1$ to $x_i$
$\sigma_i^2$—Variance of values $x_1$ to $x_i$ $$\mu_1 = x_1$$

$$\sigma_1^2 = 0$$

$$\mu_n = \mu_{n-1} + \frac{X_n - \mu_{n-1}}{n}$$

$$\sigma_n^2 = \sigma_{n-1}^2 + \left[\frac{(X_n - \mu_n)^2}{n-1} - \frac{\sigma_{n-1}^2}{n}\right]$$

During runtime execution of the RTMP analytics program, PCT_SUSPECT_TEST_nE, the recursive moving average ($\mu_k$) of PCT_SUSPECT_TEST_nE, and the recursive moving standard deviation ($\sigma_k$) of PCT_SUSPECT_TEST_nE for each merchant can be stored in an RTMP. The set of RTMPs can be indexed according to each merchant's key (mkey). These parameters can be updated with each processed transaction.

Once a merchant profile matures (after reaching a configurable threshold of g transactions, for statistical significance), a real-time estimate of PCT_SUSPECT_TEST_nE can be compared to a function that includes historical statistics $\mu_k$ and $\sigma_k$. This comparison can be used to calculate a score to determine the likelihood that a test or probe event has occurred. For example, a probe event associated with low dollar transactions can be identified by computing a PROBE_SCORE using the following relationship:

PROBE_SCORE=1, if $PCT\_LOW\_nE > \mu_k + \sigma^k$

PROBE_SCORE=0, otherwise

In this example, the variable PCT_LOW_nE can correspond to PCT_SUSPECT_TEST_nE because low dollar transactions are being considered. Although PROBE_SCORE is either 1 or 0 in this example, other implementations including, for example, different PROBE_SCORE values or a range of PROBE_SCORE values can also be used.

If, for example, the first relationship is satisfied, then a period of time during which the card can be considered probed and, consequently, at a high risk of future fraud, can be computed. This period of time can correspond to, for example, a set time or a number of transactions as described below. During this period of time, an update feature can be used to determine how long the card remains in a probed state. Because transactions using probed cards can have a high risk of fraud, probed cards can be routed through a specialized model for fraud scoring using, for example, the high risk neural network described above with respect to FIG. 4.

Figure 5:
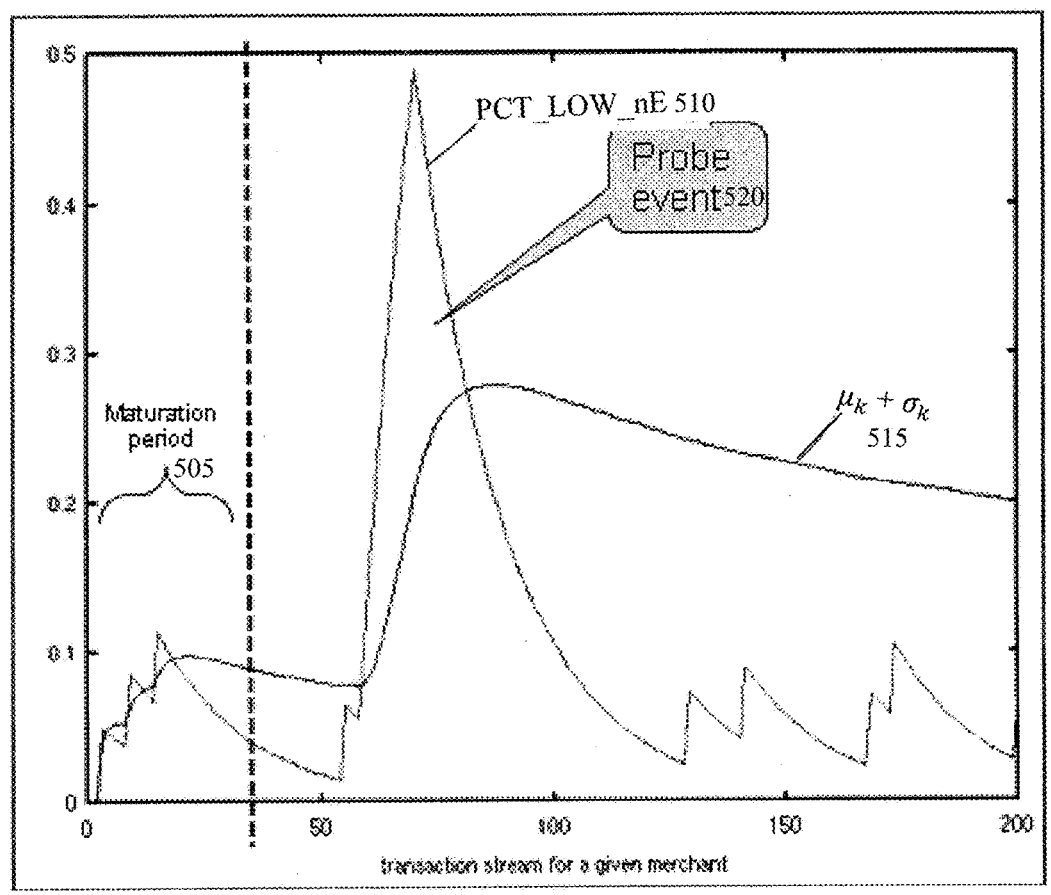
FIG. 5 illustrates an example transaction stream for a merchant during a hypothetical test or probe event.

FIG. 5 illustrates an example of a transaction stream for a merchant during a hypothetical probe event. After maturation period 505, the collected statistics for curve PCT_LOW_nE 510 can be analyzed to determine the presence of a probe event. This curve 510 can be compared to a curve of historical data represented by the sum $\mu_k + \sigma_k$ 515. The curve of historical data 515 can represent normal behavior for the merchant. A probe event 520 can appear as a spike along PCT_LOW_nE curve 510. Probe event 520 can be indicative of atypical merchant behavior.

In order to optimize the detection of a probe event, the PROBE_SCORE can be tuned to more easily identify spikes indicative of probing behavior when compared to normal merchant behavior. The analytics can be further optimized by allowing the curve representing normal merchant behavior to remain steady and not artificially increase when a probe event occurs as illustrated in FIG. 5.

Workflows

Figure 6:
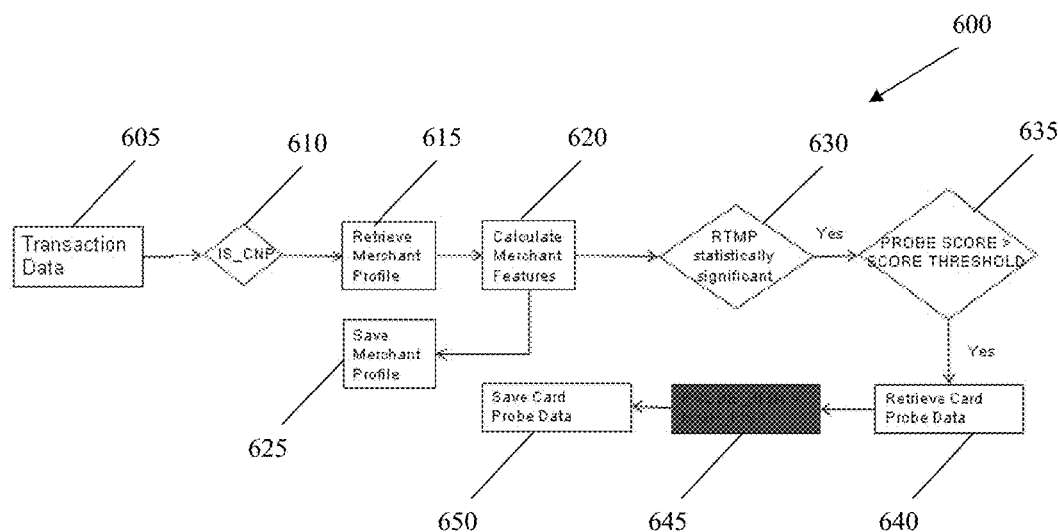
FIG. 6 illustrates an example workflow that uses a merchant's RTMP to determine whether a card has been probed.
Figure 7:
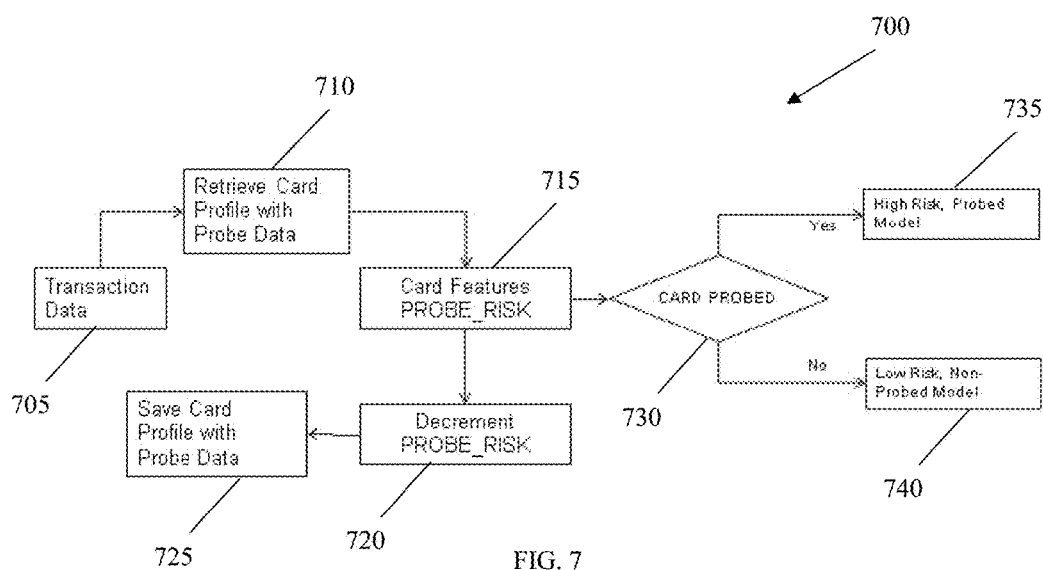
FIG. 7 illustrates an example workflow that can select a fraud scoring model based on the detection of a probe event.

FIGS. 6 and 7 illustrate example workflows for identifying a test or probe event at CNP merchant sites.

FIG. 6 is a flowchart of a process 600 that uses a merchant's RTMP to determine whether a card has been probed. At 605, transaction data for a transaction is received. At 610, it is determined whether the transaction is a CNP transaction. For non-CNP transactions, the workflow can terminate (not illustrated). If, however, the transaction is a CNP transaction, then the merchant profile associated with the merchant is retrieved at 615. Using this profile, features associated with this merchant are calculated at 620 including, for example, the variables IS_SUSPECT_TEST, PCT_SUSPECT_TEST_nE, PROBE_SCORE, $\mu_k$, and $\sigma_k$. The RTMP is updated based on the calculation of these merchant features each time a CNP transaction occurs and these changes are saved at 625. At 630, it is determined whether the RTMP has become statistically significant (i.e., matured). If so, then a PROBE_SCORE is calculated to determine the presence of a test or probe event. The PROBE_SCORE is then compared to a score threshold at 635. If the PROBE_SCORE exceeds the score threshold, then a test event has occurred and the card's probe data is retrieved at 640. At 645, the PROBE_RISK value for each probed card is set to a HIGH_RISK value. These PROBE_RISK values are saved at 650 and can be later retrieved when these cards are used in subsequent transactions.

FIG. 7 is a flowchart of a process 700 for selecting a fraud scoring model based on detection of a probe event. At 705, transaction data for a transaction is received. At 710, the card's profile is retrieved. This profile includes data indicative of whether the card has been probed including, for example, a PROBE_RISK. The PROBE_RISK associated with the card profile is checked at 715.

The PROBE_RISK variable can be used to determine whether the card is in a probed state. Whether a card is probed is checked at 730. If the card is in a probed state, then there may be a high risk that the card will be used in a fraudulent transaction. Accordingly, a probed card can be scored using a high risk, probed card model at 735. If the card is not in a probed state, then the transaction can be scored using a low risk, non-probed model at 740.

The PROBE_RISK variable can also be used to dictate the period of time that a card is considered at risk (i.e., in a probed state). When a card's PROBE_RISK variable is checked, the system can decrement the PROBE_RISK value at 720 if, for example, a given amount of time has elapsed since the test event. In other implementations, the PROBE_RISK can be removed altogether. Adjustments to the PROBE_RISK variable can be saved to the card profile store at 725 and made available if the card is involved in a subsequent transaction.

Event Profiles and Probe Risk

As discussed above with respect to FIG. 7, a PROBE_RISK variable can be used to manage the duration of time that a card is considered at risk. Once a test or probe event has been detected, analytics can be applied to maintain a PROBE_RISK on the associated card.

In an exemplary implementation, a period of time can be specified during which the PROBE_RISK value remains associated with a card. For example, a card can be considered probed for 30 days following a test event or for the next 5 transactions.

Analytics can be performed to determine the optimal criteria for managing a card's probe risk. Although simple criteria, like the passage of time as describe above, can be used, more complex criteria can also be envisioned. Generally, the selected criteria should be complex enough to prevent fraudsters from easily learning when a card is in a high risk state. Accordingly, probe risk updates can involve complex, adaptive algorithms that can be based on the behavior of all cards associated with the test event.

Figure 8:
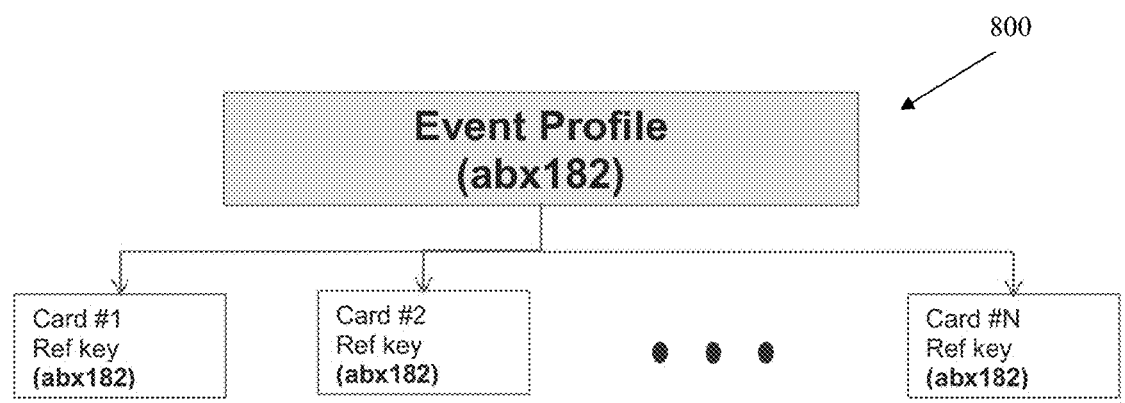
FIG. 8 illustrates an example event profile.

The exemplary implementation of FIG. 8 illustrates the use of an event profile to update a card's PROBE_RISK variable. An event profile 800 can link together all cards associated with the same test or probe event using an event profile key. This event profile key can be assigned to the PROBE_RISK variable. In the example of FIG. 8, event key abx182 can be associated with cards 1, 2, . . . N.

Linking cards together can allow the behavior of one cluster of cards to affect the behavior of another cluster of cards with regard to the PROBE_RISK variable. For example, if 60% of cards 1 through N in FIG. 8 have been used in fraudulent transactions, then there can be a high likelihood that the remaining 40% of the cards may also be used fraudulently. As such, the PROBE_RISK variable for these remaining cards can be updated to reflect that likelihood. These updates can be made when these cards are used in subsequent transactions.

With reference to FIG. 7, for example, when one of these cards is used in a transaction, the card's profile can be retrieved from a card profile store. The card profile can include an event profile as described above. Statistics associated with this particular card's event profile can be updated to reflect high risk behavior occurring in any of the cards linked with the same event key. High risk behavior can include, for example, a high fraud score or a disposition that a card has been used fraudulently. This information can be used to update the PROBE_RISK variable associated with the card which, in turn, can affect the scoring process.

Figure 9:
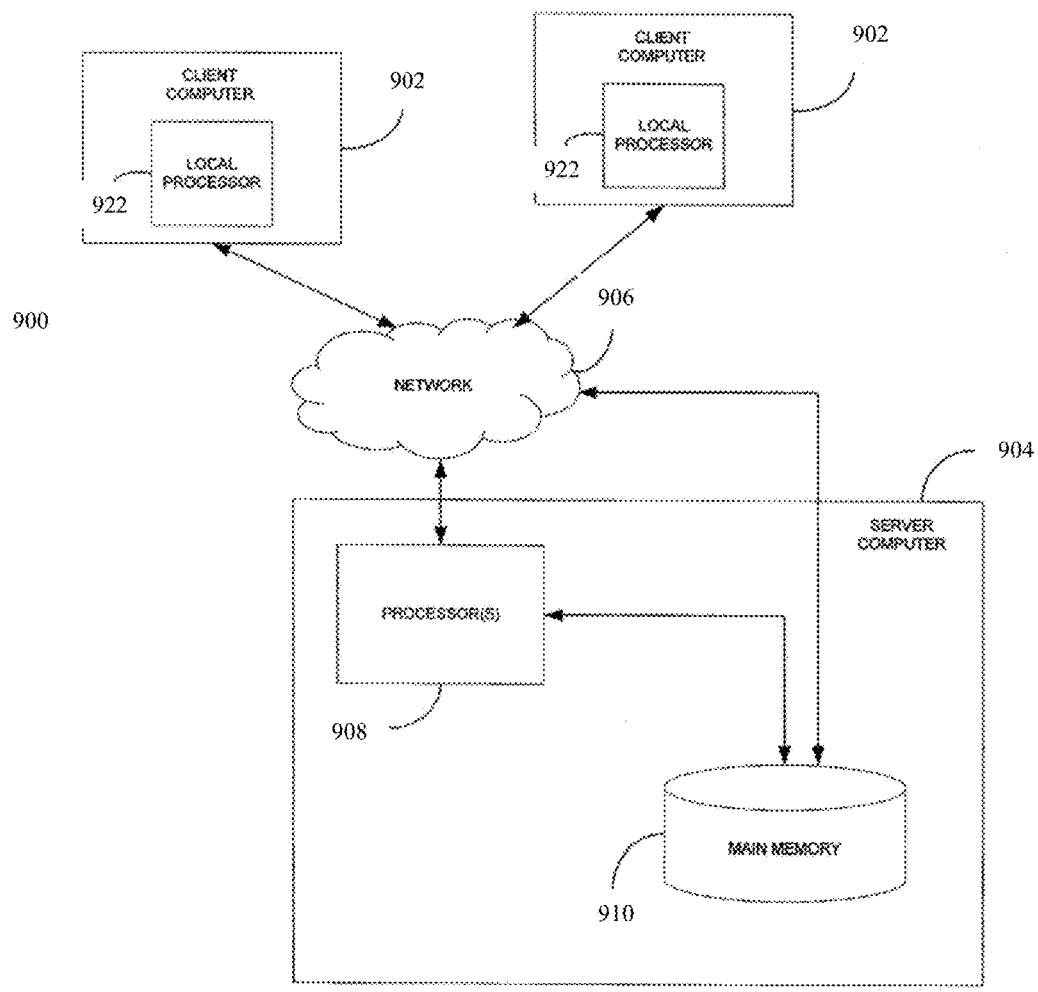
FIG. 9 illustrates an example system for executing a method for detecting in real-time the presence of a test or probe event and the selection of an appropriate scoring methodology.

FIG. 9 illustrates an exemplary implementation of a computer system 900 for executing a method for detecting in real-time the presence of a test or probe event and the selection of an appropriate scoring methodology, as described above with respect to FIGS. 1-8. The computer system 900 can include a number of client computers 902 each having a local processor 922 executing a program for managing, monitoring, or controlling one or more of the financial services/channels. The client computers 902 can be associated with a bank, a credit agency, or other financial institution. The client computers 902 may also act as a server computer within a local network for the financial institution.

The client computers 902 are connected to a server computer 904 via network 906, which can include any number of communications networks. The server computer 904 includes one or more processors 908 for executing instructions of the method for developing financial risk decisions for the customer. The method can be stored as instructions in main memory 910, which can be any form of persistent storage as described below. Access to the instructions from main memory 910 can also be directly from local processors 922 of any of the client computers 902 through the network 906.

Some or all of the functional operations described in this specification can be implemented in digital electronic circuitry, or in computer software, firmware, or hardware, including the structures disclosed in this specification and their structural equivalents, or in combinations of them. Implementations of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Exemplary implementations can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such, back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementations, may also be provided in combination in a single implementation. Conversely, various features which, for brevity, are described in the context of a single implementation, may also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method comprising:
   receiving, from a first computing device controlling one or more financial services and over one or more financial channels, data associated with a transaction involving a financial transaction device, the transaction occurring at an Internet website of a merchant, the merchant having a merchant profile, the merchant profile associated with a set of variables;
   retrieving, from a merchant profile store, the merchant profile for the merchant;
   retrieving, from a card profile store, a financial transaction device profile for the financial transaction device;
   determining whether the transaction is a test event by:
      calculating a score using the received data and the set of variables; and
      comparing the score to a threshold value;
   attaching, in response to the determining, a merchant probe flag to the merchant profile, the merchant probe flag indicating a likelihood that the test event has occurred at the Internet website of the merchant;
   attaching, to the financial transaction profile and in response to the merchant probe flag being attached to the merchant profile, a probe flag associated with the financial transaction device to indicate whether the financial transaction device is in a probed state;
   receiving, from a second computing device controlling one or more financial services and over one or more financial channels, data associated with a second transaction involving the financial transaction device having the probe flag;
   subjecting, in response to the financial transaction device having the probe flag, the second transaction and the financial transaction device to a specialized fraud scoring model, the specialized fraud scoring model separate from the fraud model applied to financial transactions associated with financial transaction devices that do not have the probe flag; and
   blocking the second transaction from completing based on a fraud score using the specialized fraud scoring model satisfying a threshold value, and
   wherein the receiving, the retrieving, the calculating, the determining, the attaching, the subjecting, and the blocking are performed by at least one processor.

2. The method of claim 1, wherein the attaching of the probe flag associated with the financial transaction device occurs after the merchant probe flag is attached to the merchant profile.

3. The method of claim 1, further comprising:
   executing, by at least one processor, a first scoring methodology when the probe flag indicates that the financial transaction device is in the probed state and a second scoring methodology when the probe flag indicates that the financial transaction device is in the unprobed state.

4. The method of claim 1, further comprising:
updating, by at least one processor, a probe risk associated with the financial transaction device, the probe risk specifying a period of time that the financial transaction device is considered at risk.

5. The method of claim 4, wherein the updating involves decrementing the probe risk after a predefined period of time or after a predefined number of transactions involving the financial transaction device.

6. The method of claim 4, wherein the financial transaction device is associated with an event key representing the test event, and wherein the updating involves increasing the probe risk when at least a second financial transaction device having the same event key has been used fraudulently or has been involved in a transaction associated with a fraud score exceeding a threshold value.

7. The method of claim 1, wherein the calculating uses a recursive transaction function to characterize behavior indicative of the test event.

8. The method of claim 1, wherein the test event is a pattern of successive low dollar purchases.

9. The method of claim 1, wherein the financial transaction device is a credit card, a debit card, or a smart phone configured to execute a financial transaction application.

10. The method of claim 1, wherein the specialized fraud model is a specialized high risk neural network model, the specialized high risk neural network model configured to detect fraudulent transactions with greater accuracy than a low risk neural network model.

11. A computer program product comprising:
a non-transitory storage medium readable by at least one processor and storing instructions for execution by the at least one processor, the instructions comprising:
receiving data associated with a transaction involving a financial transaction device, the transaction occurring at an Internet website of a merchant, the merchant having a merchant profile associated with a set of variables;
determining whether the transaction is a test event by:
calculating a score using the received data and the set of variables; and
comparing the score to a threshold value
the test event indicating a likely fraudulent use of the financial transaction device;
attaching, in response to the determining, a merchant probe flag to the merchant profile, the merchant probe flag indicating a likelihood that the test event has occurred at the Internet website of the merchant;
setting a probe flag associated with the financial transaction device to indicate that the financial transaction device is in a probed state;
receiving data associated with a second transaction involving the financial transaction device having the probe flag;
subjecting, in response to the financial transaction device having the probe flag, the second transaction and the financial transaction device to a specialized fraud scoring model, the specialized fraud scoring model separate from a fraud model applied to financial transactions associated with financial transaction devices that do not have the probe flag set; and
blocking the second transaction from completing based on a fraud score calculated using the specialized fraud scoring model satisfying a threshold value.

12. The computer program product of claim 11, wherein the setting occurs after the merchant probe flag is attached to the merchant profile.

13. The computer program product of claim 11, the instructions further comprising executing a first scoring methodology when the probe flag indicates that the financial transaction device is in the probed state and a second scoring methodology when the probe flag indicates that the financial transaction device is not in the probed state.

14. The computer program product of claim 11, the instructions further comprising updating a probe risk associated with the financial transaction device, the probe risk specifying a period of time that the financial transaction device is considered at risk.

15. The computer program product of claim 14, wherein the updating involves decrementing the probe risk after a predefined period of time or after a predefined number of transactions involving the financial transaction device.

16. The computer program product of claim 14, wherein the financial transaction device is associated with an event key representing the test event, and wherein the updating involves increasing the probe risk when at least a second financial transaction device having the same event key has been used fraudulently or has been involved in a transaction associated with a fraud score exceeding a threshold value.

17. The computer program product of claim 11, wherein the calculating uses a recursive transaction function to characterize behavior indicative of the test event.

18. The computer program product of claim 11, wherein the test event is a pattern of successive low dollar purchases.

19. A system comprising:
a first computer program module that receives data associated with a transaction involving a financial transaction device, the transaction occurring at an Internet website of a merchant, the merchant having a merchant profile associated with a set of variables;
a second computer program module that determines that the transaction is a test event by:
calculating a score using the received data and the set of variables; and
comparing the score to a threshold value;
a third computer program module that attaches, in response to the determining, a merchant probe flag to the merchant profile, the merchant probe flag indicating a likelihood that the test event has occurred at the Internet website of the merchant;
a fourth computer program module that sets a probe flag associated with the financial transaction device to indicate that the financial transaction device is in a probed state;
the first computer program module is configured to receiving data associated with a second transaction involving the financial transaction device having the probe flag;
a fifth computer program module configured to subject the second transaction and the financial transaction device having the probe flag to a specialized fraud scoring model, the specialized fraud scoring model separate from a fraud model applied to financial transactions associated with financial transaction devices that do not have the probe flag set; and
a sixth computer program module configured to block the second transaction from completing based on a fraud score using the specialized fraud scoring model satisfying a threshold value,
wherein the first computer program module, the second computer program module, the third computer program module, the fourth computer program module, the fifth computer program module, and the sixth computer program module comprise at least one processor.

20. The system of claim 19, wherein the setting occurs after the merchant probe flag is attached to the merchant profile, the test event indicating a likely fraudulent use of the financial transaction device.

* * * * *